United States Patent [19]

Harafuji et al.

[11] Patent Number: 4,644,458
[45] Date of Patent: Feb. 17, 1987

[54] ELECTRIC POWER SUPPLY CIRCUIT CAPABLE OF REDUCING A LOSS OF ELECTRIC POWER

[75] Inventors: Yoshihiko Harafuji; Hideki Yamamoto; Katsuhiko Yamamoto, all of Tokyo, Japan

[73] Assignees: NEC Corporation; Nippon Telegraph & Telephone Public Corporation, both of Japan

[21] Appl. No.: 712,990

[22] Filed: Mar. 18, 1985

[30] Foreign Application Priority Data

Mar. 19, 1984 [JP] Japan .................................. 59-53169
Mar. 30, 1984 [JP] Japan .................................. 59-62428
Mar. 30, 1984 [JP] Japan .................................. 59-62429

[51] Int. Cl.[4] ............................................. H02M 3/28
[52] U.S. Cl. .......................................... 363/65; 363/71; 363/95
[58] Field of Search ................ 363/15, 37, 50-58, 363/65, 68, 71, 95-98; 323/271

[56] References Cited

U.S. PATENT DOCUMENTS 3,818,307 6/1974 Hamilton et al. ................ 363/65 X
4,062,057 12/1977 Perkins et al. ...................... 361/71

FOREIGN PATENT DOCUMENTS 0060954 5/1977 Japan ..................................... 363/71
0063575 5/1980 Japan ..................................... 363/71

Primary Examiner—Peter S. Wong
Attorney, Agent, or Firm—Laff, Whitesel, Conte & Saret

[57] ABSTRACT

In an electric power supply circuit comprising a plurality of constant current units each of which is controllable by a control voltage ($V_c$) to keep a circuit output current ($I_{OUT}$) substantially constant and which has no shunt resistor, the control voltage is supplied from a single current to voltage converter (44) operable in response to a control current ($I_c$) corresponding to the circuit output current. A control unit (39) produces the control current in response to a detection signal supplied from a current detector (37) and representative of a result of detection of the circuit output current. A plurality of current detectors may be coupled to a plurality of control units coupled in common to the single current to voltage converter. The single current to voltage converter may be a saturable reactor, a resistor, or the like. Alternatively, each of the constant current units may comprise a shunt resistor when the shunt resistor is connected in series to a current restriction circuit coupled to an additional winding attached to the current detector.

9 Claims, 13 Drawing Figures

ELECTRIC POWER SUPPLY CIRCUIT CAPABLE OF REDUCING A LOSS OF ELECTRIC POWER

BACKGROUND OF THE INVENTION

This invention relates to an electric power supply circuit for use in a digital carrier transmission system of a distant power feeding type to supply a load with a constant current and to a constant current unit for use in the electric power supply circuit.

A conventional electric power supply circuit of the type described comprises a plurality of constant current units connected in series to a load, such as a repeater amplifier and the like, included in a current path and has therefore a redundant structure in order to compensate for a failure of each constant current unit. In addition, it is a recent trend that the repeater amplifier has a wide variety of functions. Under the circumstances, the electric power supply circuit should produce an output current which amounts to 500 mA~2A. A maximum output voltage must reach 15 kV. Accordingly, each of the constant current units should have a high power and a high efficiency on DC-DC power conversion.

For this purpose, a constant current converter of a resonant type has been developed as each of the constant current units in order to accomplish an efficiency which is not lower than 90%.

As will later be described with reference to a few figures of the accompanying drawing, the constant current converter comprises an inverter circuit which is controllable by a local signal of a controllable frequency and which converts a d.c. input signal into an a.c. output signal. The a.c. output signal is sent through a resonant circuit to a rectifying and smoothing circuit to be converted into a resultant d.c. current. The resultant d.c. current is delivered to the load and is monitored by a current detector. A detection signal is supplied from the current detector through a control circuit to a voltage to frequency converter as a control voltage signal. The voltage to frequency converter supplies the inverter circuit with the local signal of the frequency controlled by the control voltage signal. With this structure, the resultant d.c. current can be kept substantially constant, as is well known in the art.

When a plurality of constant current converters are connected in series to the load, a resistor should be connected in parallel to each constant current converter so as to stably divide the load to the respective constant current converters. Otherwise, overload occurs in one or more of the constant current converters when the resultant d.c. current varies within a range determined for each of the constant current converters.

However, connection of the resistors to the converters results in degradation of a constant current characteristic and in a loss of electric power due to currents which flow through the respective resistors. Heat is inevitably produced in the resistors and requires a countermeasure. As a result, each of the converters becomes bulky.

In addition, the control circuit and the current detector should be installed in each of the converters, which makes the electric power supply circuit expensive. Furthermore, it takes a long time to adjust the whole current of the electric power supply circuit to a desired constant value.

A paper is contributed by Jun Chida et al to "National Convention Record (in English translation)" of the Institute of Electronics and Communication Engineers of Japan, published Mar. 5, 1984, pages 10–30, under the title of "Control Circuit for Series Resonant Constant Current Converter (in English translation)." In the Chida et al paper, an electric power supply circuit is disclosed which comprises a plurality of constant current converters connected in series to a load without any resistors so as to avoid the above-enumerated defects resulting from connection of the resistors. To this end, a set of current detectors is coupled to a set of control circuits outside of the converters to produce a control current signal common to the respective constant current converters. The control current signal is individually converted into control voltages of current to voltage converters installed in the respective constant current converters, respectively. The control voltages are further converted into local signals of frequencies controlled by the control voltages in the manner described before.

With this structure, each converter should have the current to voltage converter and therefore becomes intricate in structure.

SUMMARY OF THE INVENTION

It is an object of this invention to provide an electric power supply circuit which can mitigate various disadvantages resulting from connection of a resistor to each constant current converter.

It is another object of this invention to provide an electric power supply circuit of the type described, wherein a loss of electric power can be reduced in each constant current converter even when the resistor is included in the control current converter.

It is yet another object of this invention to provide an electric power supply circuit of the type described, wherein no resistor is necessary in each constant current converter.

It is still another object of this invention to provide an electric power supply circuit of the type described, which is very simple in structure.

An electric power supply circuit to which this invention is applicable includes a plurality of constant current units connected in series to a pair of terminals for supplying an electric current to a current path which is shared by the constant current units as a load, current detecting means coupled to the current path for detecting the electric current to produce a detection signal having a detection voltage, and control means responsive to the detection signal for producing a control current. Each of the constant current units is controllable by a control voltage corresponding to the control current to share the load with the respective constant current units as partial loads of a predetermined distribution. According to this invention, the electric power supply circuit comprises single current to voltage converting means coupled to the control means and responsive to the control current for converting the control current into a converted voltage and voltage supply means coupled to the current to voltage converting means for supplying the converted voltage to the constant current units in common as the control voltage to control the partial loads in compliance with the predetermined distribution.

DESCRIPTION OF THE PREFERRED EMBODIMENTS

Figure 1:
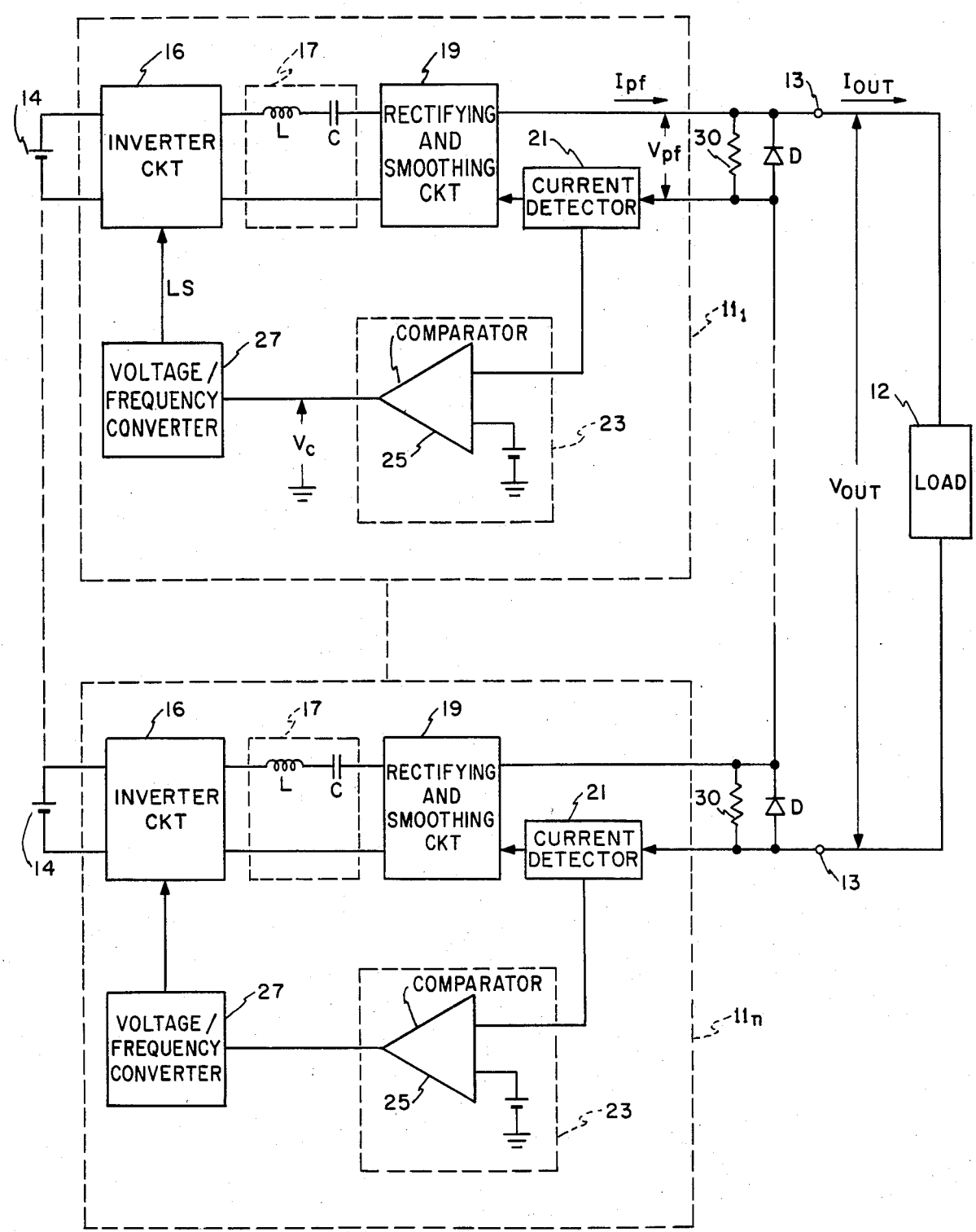
FIG. 1 is a block diagram of a conventional electric power supply circuit.

Referring to FIG. 1, description will be made as regards a conventional electric power supply circuit at first in order to facilitate an understanding of the present invention. The electric power supply circuit comprises a plurality of constant current converters which are n in number and which are indicated at $11_1$ to $11_n$, respectively. The constant current converters $11_1$ through $11_n$ are connected in series to a load 12 through a pair of output terminals 13 and a current path of, for example, an optical fiber.

Each of the constant current converters 11 (suffixes omitted) is supplied with a d.c. input signal from a main power source 14 and comprises an inverter circuit 16 for converting the d.c. input signal into an a.c. output signal in accordance with a local signal LS of a controllable frequency $f_{sw}$. The local signal LS will be described later and the controllable frequency $f_{sw}$ will be called an operational frequency of the inverter circuit 16. The a.c. output signal has a frequency equal to the operational frequency $f_{sw}$ of the local signal LS and is sent to a series resonant circuit 17 and thereafter to a rectifying and smoothing circuit 19. The series resonant circuit 17 comprises a capacitor C and a choke coil L, as shown in FIG. 1. Let the series resonant circuit 17 have a resonant frequency $f_{res}$. The operational and the resonant frequencies $f_{sw}$ and $f_{res}$ have a frequency ratio $\delta$, namely, $f_{sw}/f_{res}$.

The rectifying and smoothing circuit 19 produces d.c. electric power of a resultant d.c. current $I_{pf}$ and a resultant d.c. voltage $V_{pf}$. A current detector 21 detects a detecting current in a manner to be described to produce a detection signal representative of a result of detection. The detection signal has a detection voltage corresponding to the electric current and is supplied to a voltage control circuit 23. The voltage control circuit 23 comprises a comparator 25 for comparing the detection signal with a reference voltage $V_r$ given from a reference voltage source (unnumbered) to produce a difference voltage representative of a difference between the detection voltage and the reference voltage $V_r$.

Responsive to the difference voltage $V_c$, a voltage to frequency converter 27 converts the difference voltage $V_c$ into a frequency signal having a frequency corresponding to the difference voltage $V_c$. The frequency signal is sent to the inverter circuit 16 as the local signal LS. In each of the constant current converters 11, the rectifying and smoothing circuit 19 is supplied with the a.c. output signal, with electric power depending on the frquency ratio $\delta$.

Figure 2:
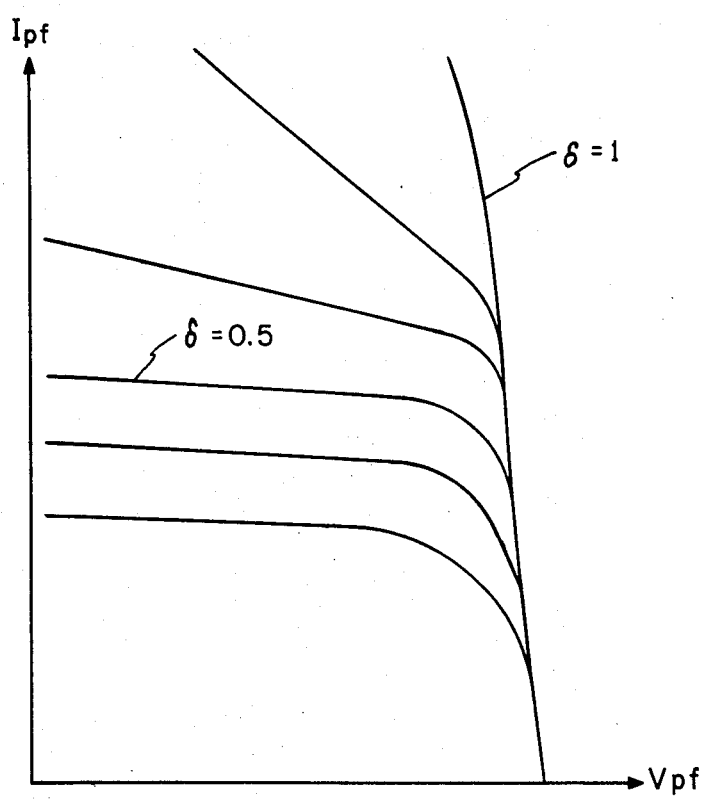
FIG. 2 is a graphical representation for use in describing operation of the conventional electric power supply circuit and an electric power supply circuit according to a first embodiment of this invention, respectively.

Temporarily referring to FIG. 2, the rectifying and smoothing circuit 19 produces the resultant d.c. voltage $V_{pf}$ and the resultant d.c. current $I_{pf}$ which are dependent on the frequency ratio $\delta$ when put into an uncontrolled state. More specifically, when the frequency ratio $\delta$ is equal to 1, the resultant d.c. voltage $V_{pf}$ is kept substantially constant. Thus, the rectifying and smoothing circuit 19 shows a constant voltage characteristic. This is because an impedance of the series resonant circuit 17 becomes zero and an output impedance of the rectifying and smoothing circuit 19 becomes low.

With a reduction of the frequency ratio $\delta$, the output impedance of the rectifying and smoothing circuit 19 becomes high. As shown in FIG. 2, saturation occurs when the resultant d.c. current $I_{pf}$ is small. In particular, the output impedance becomes substantially constant at a finite resultant d.c. current $I_{pf}$ when the frequency ratio $\delta$ becomes equal to or lower than 0.5. The resultant d.c. current $I_{pf}$ can therefore be controlled by varying the frequency ratio $\delta$.

Under the circumstances, the frequency ratio $\delta$ is controlled in each constant current converter 11 so that the resultant d.c. current $I_{pf}$ becomes constant in the manner described before. In such a controlled state, the output impedance of the rectifying and smoothing circuit 19 becomes extremely high.

Turning back to FIG. 1, the plurality of constant current converters 11 shares the load 12 with a predetermined distribution. The series connection of the plurality of constant current converters 11 results in a variation of the predetermined distribution when the resultant d.c. current fluctuates within a range accepted in each constant current converter in a part of the constant current converters 11. Overload partially takes place in the constant current converters.

In order to avoid the overload, a resistor 30 is connected in parallel to each converter 11, as illustrated in FIG. 1 and may be called a shunt resistor. When the resistor 30 has a resistance of $R_{pf}$, each output impedance of the converters is kept at $R_{pf}$. As a result, the load 12 is stably shared by the respective converters.

The series connection of the converters 11 gives a circuit output impedance equal to $n \cdot R_{pf}$ and has a current versus voltage characteristic between a circuit output current $I_{OUT}$ and a circuit output voltage $V_{OUT}$. The circuit output current $I_{OUT}$ flows through the current path defined by the load and each of the converters 11 in the known manner when the converters 11 are all normal. The circuit output current $I_{OUT}$ is given as the detecting current to each of the current detectors 21.

Figure 3:
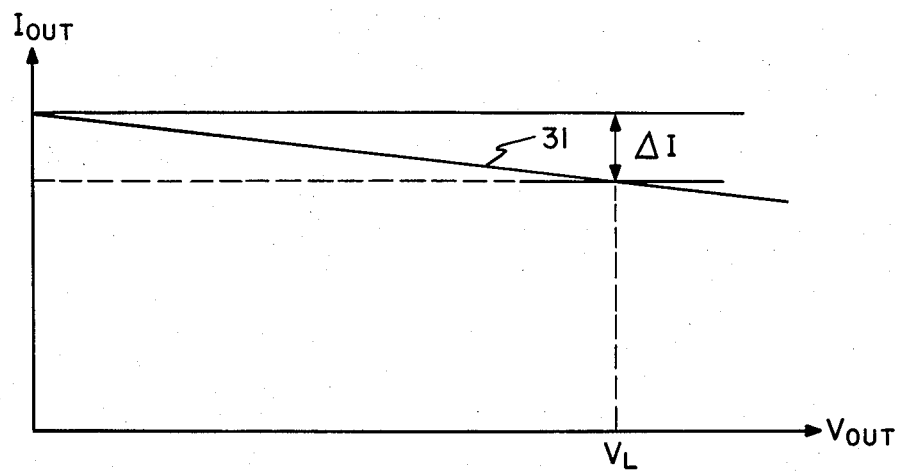
FIG. 3 is another graphical representation for use in describing operation of the conventional electric power supply circuit.

Referring to FIG. 3 together with FIG. 1, a curve 31 exemplifies the current versus voltage characteristic of the electric power supply circuit illustrated in FIG. 1. As readily understood from the curve 31, the circuit output current $I_{OUT}$ is reduced with an increase of the circuit output voltage $V_{OUT}$. This means that a constant current characteristic is degraded as the circuit output voltage $V_{OUT}$ increases. As regards the curve 31, the circuit output current $I_{OUT}$ is reduced by a decrement $\Delta I$ into $I_L$ when the illustrated circuit is operated at a load voltage $V_L$ across the load 12. The decrement $\Delta I$ is represented by:

$$\Delta I = V_L / n \cdot R_{pf}. \quad (1)$$

From Equation (1), it is readily understood that degradation of a constant current characteristic results from connection of the resistors 30. In addition, an electric current for the decrement $\Delta I$ flows through the resistors 30 and brings about a loss $W_r$ of electric power which is represented by $V_L^2 / n \cdot R_{pf}$.

Accordingly, the illustrated electric power supply circuit has various disadvantages as pointed out in the preamble of the instant specification. Furthermore, each resultant d.c. current $I_{pf}$ should individually be adjusted to a desired value. Such individual adjustment is very troublesome.

In FIG. 1, a diode D is connected in parallel to each of the resistors 30. Each diode D serves to bypass the circuit output $I_{OUT}$ during a failure of each constant current converter 11 connected to each diode D, as known in the art. In other words, the circuit output current $I_{OUT}$ does not flow through each diode during a normal operation of the corresponding converter 11 but is sent to the rectifying and smoothing circuit 19 of the corresponding converter 11.

Figure 4:
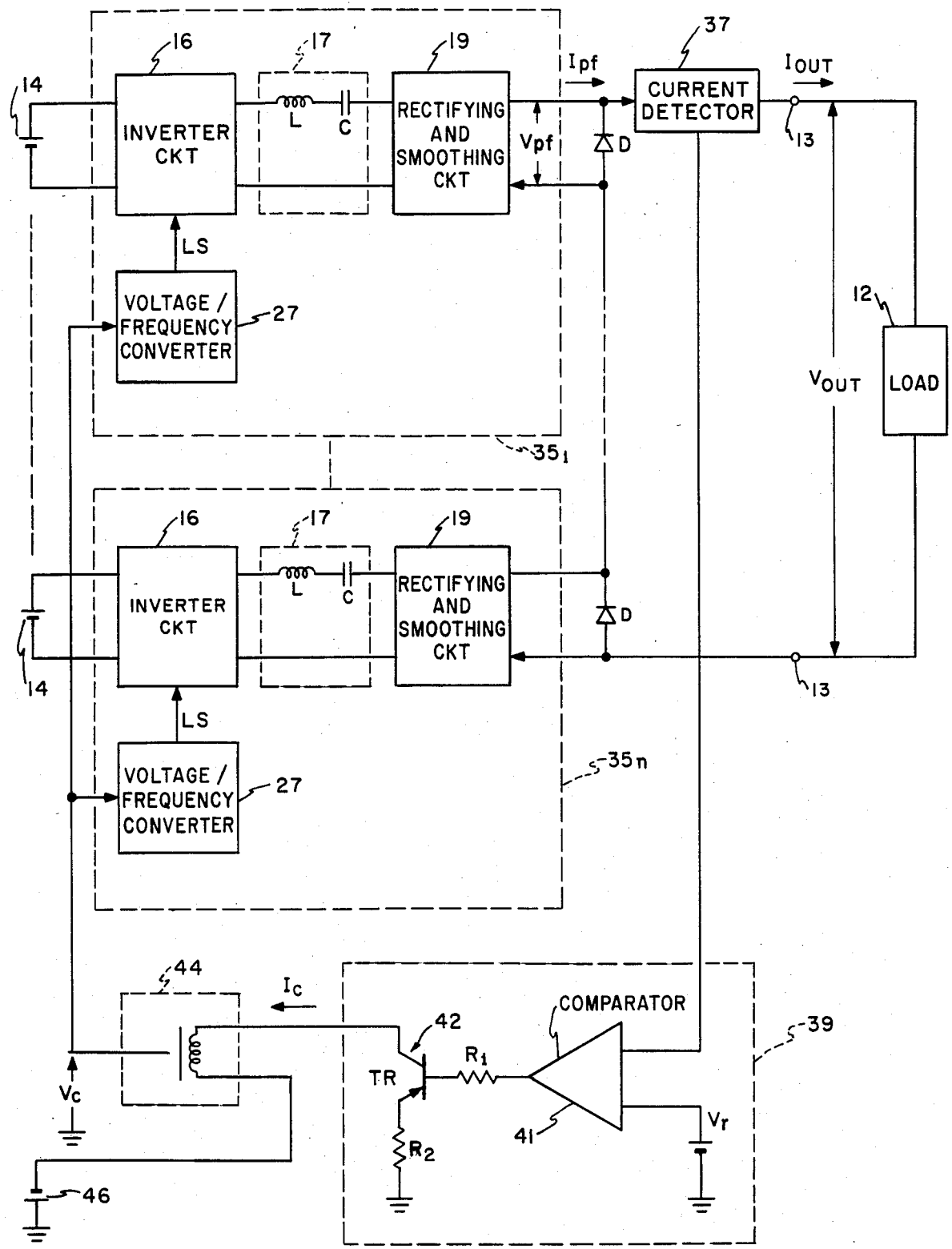
FIG. 4 is a block diagram of the electric power supply circuit according to the first embodiment of this invention.

Referring to FIG. 4, an electric power supply circuit according to a first embodiment of this invention comprises similar parts and signals designated by like reference numerals and symbols. The illustrated electric power supply circuit comprises a plurality of constant current units which are somewhat different from the constant current converters $11_1$ to $11_n$ and which are therefore indicated at $35_1$ through $35_n$. Each of the constant current units 35 is coupled in series to the load 12 like in FIG. 1 and comprises an inverter circuit 16, a series resonant circuit 17, a rectifying and smoothing circuit 19, and a voltage to frequency converter 27 which are all similar to those illustrated in conjunction with FIG. 1, respectively. It is to be noted here that each of the constant current units 35 (suffixes omitted) comprises neither a current detector nor a control circuit, differing from the constant current converters illustrated in FIG. 1. The inverter circuits 16 are placed on input sides thereof and supplied with d.c. input signals (depicted at E). Each of the rectifying and smoothing circuits 19 is placed on each output side of the inverter circuits 16 and produces electric power of a resultant d.c. current $I_{pf}$ and a resultant d.c. voltage $V_{pf}$. A diode D is connected in parallel to the rectifying and smoothing circuit 19 of each unit 35, like in FIG. 1. However, no shunt resistor is connected to the respective constant current units 35.

Anyway, the illustrated electric power supply circuit produces the circuit output current $I_{OUT}$ and the circuit output voltage $V_{OUT}$. Like in FIG. 1, the circuit output current $I_{OUT}$ flows through a current path including the load 12 and each of the constant current units 35. The circuit output voltage $V_{OUT}$ develops across the output terminals 13 and is equal to a sum of the resultant d.c. voltages $V_{pf}$ produced by the constant current units 35.

In FIG. 4, a single current detector 37 is coupled outside of each constant current unit 35 to the current path to detect the circuit output current $I_{OUT}$ as the detecting current. The current detector 37 produces a detection signal which has a detection voltage proportional to the circuit output current $I_{OUT}$ and which is representative of a result of detection.

The detection signal is delivered from the current detector 37 to a single or common control circuit 39 comprising a comparator 41 and a current output circuit 42. The comparator 41 compares the detection voltage with a reference voltage $V_r$ in the manner described in FIG. 1 to supply the current output circuit 42 with a result signal representative of a result of comparison. The result signal is specified by a voltage difference between the detection voltage and the reference voltage $V_r$.

The current output circuit 42 comprises a transistor TR and first and second resistors $R_1$ and $R_2$ connected to the base and the emitter of the transistor TR, respectively. The emitter is grounded through the second resistor $R_2$. The result signal is given to the base through the first resistor $R_1$ and converted into a control current $I_c$ corresponding to the result signal.

The control current $I_c$ is supplied to a current to voltage converter 44, such as a magnetic amplifier, a photocoupler, or the like, which is connected to a d.c. drive source 46 having a positive and a negative terminal. In the example being illustrated, the magnetic amplifier is used as the current to voltage converter 44 and comprises a saturable reactor comprising an input winding connected to the negative terminal of the d.c. drive source 46 grounded at the positive terminal. The d.c. drive source 46 may be either common to or different from one of the main power sources 14.

At any rate, the control current $I_c$ is converted by the current to voltage converter 44 into a converted voltage as a control voltage $V_c$. The control voltage $V_c$ is delivered as the local signal LS to the voltage to frequency converters 27 of the respective constant current units 35. Each voltage to frequency converter 27 controls the operation frequency of each inverter circuit 16 in the manner described in conjunction with FIG. 1. Thus, a connection between the current to voltage converter 44 and each voltage to frequency converter 27 may be referred to as a voltage supply circuit for supplying the control voltage $V_c$ to the constant current units 35 in common.

Specifically, the frequency ratio of each unit 35 is controlled in common by the control voltage $V_c$ so that the circuit output current $I_{OUT}$ is kept constant. To this end, the frequency ratio may be selected between 0 and 0.5, both inclusive. Thus, common control of the frequency ratio $\delta$ serves to keep the circuit output current $I_{OUT}$ substantially constant. This means that an output impedance of the electric power supply circuit is kept high and that the circuit output current $I_{OUT}$ is not reduced even when the circuit output voltage $V_{OUT}$ increases.

On the other hand, each constant current unit 35 has an output characteristic similar to that illustrated in FIG. 2 and therefore exhibits a unit output impedance equal to a certain finite value. Each unit output impedance serves to determine a share of the load, namely, each partial load for each constant current unit 35, like the shunt resistors 30 illustrated in FIG. 1. Thus, the load is stably shared by the respective constant current units 35.

Each unit output impedance is varied in dependence upon the frequency ratio δ. However, it is possible to make the frequency ratio δ of each unit 35 equal to one another by selecting the constant current units 35. More specifically, if a resonant frequency of each resonant circuit 17 and a conversion ratio of each voltage to frequency converter 27 are equal to one another, the constant current units 35 have the same frequency ratios. Under the circumstances, the load 12 is equally shared by the constant current units 35 without use of any resistors. The resultant voltage $V_{pf}$ of each constant current unit 35 becomes equal to 1/n of the circuit output voltage $V_{OUT}$.

Thus, the above-mentioned circuit is advantageous in that conversion efficiency is improved because no shunt resistor results in a reduction of power consumption. In addition, no countermeasure is necessary for heat produced from the shunt resistors 30. The circuit therefore becomes compact. Inasmuch as the output impedance of the circuit is extremely high, it is possible to accurately accomplish a constant current characteristic. Inasmuch as a single control circuit 39 and a single current to voltage converter 44 control the plurality of the constant current units 35 in common, the illustrated circuit is constructed by a small number of parts and is therefore simple in structure and inexpensive. Furthermore, the circuit output current $I_{OUT}$ can be adjusted by controlling the reference voltage $V_r$ alone. It is therefore possible to save time for adjusting the circuit output current $I_{OUT}$.

Like in FIG. 1, the circuit is normally operable even when the constant current units 35 may individually be separated from the circuit. This is because the circuit output current $I_{OUT}$ passes through the diode D when the corresponding constant current unit is removed from the circuit.

Figure 5:
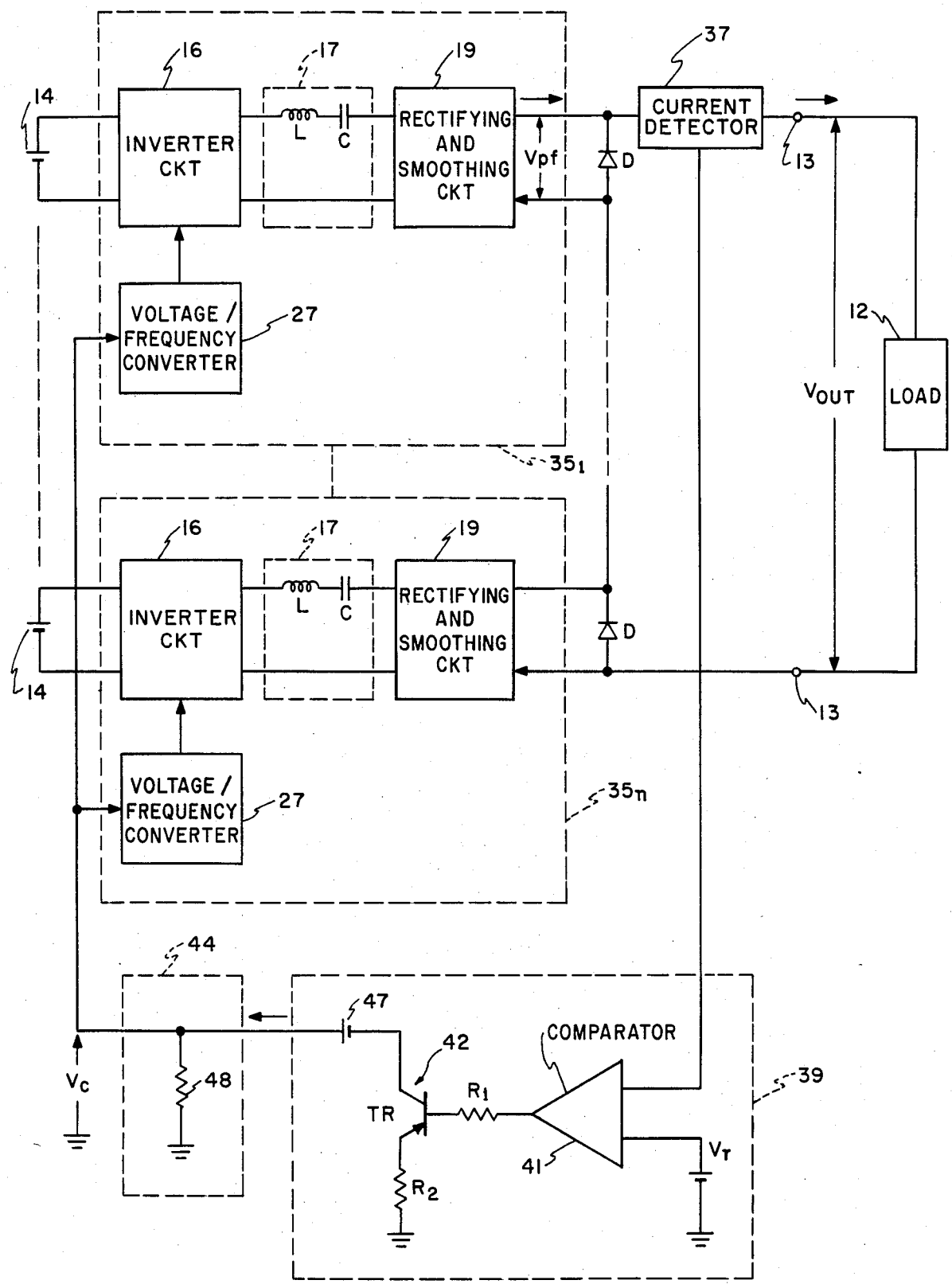
FIG. 5 is a block diagram of an electric power supply circuit according to a second embodiment of this invention.

Referring to FIG. 5, an electric power supply circuit according to a second embodiment of this invention comprises similar parts and signals designated by like reference numerals and symbols. The illustrated control circuit 39 comprises an additional power source 47 which has a negative terminal connected to the collector of the transistor TR and a positive terminal connected to the current to voltage converter 44. Thus, the additional power source 47 is connected in series to the collector of the transistor TR and isolated from the ground. The control current $I_c$ is supplied from the control circuit 39 to the current to voltage converter 44. The illustrated current to voltage converter 44 is constituted by an additional resistor 48 of resistance R.

It is assumed that each of the voltage to frequency converters has an input impedance $R_{in}$ extremely small in comparison with the resistance R of the additional resistor 48. In this event, the control or converted voltage $V_c$ is substantially given by $I_c \cdot R$ and is therefore proportional to the control current $I_c$.

The control voltage $V_c$ is delivered in common or in parallel to the respective voltage to frequency converters 27. As a result, the constant current units 35 are controlled by the control voltage $V_c$ in common and supply the load with the circuit output current $I_{OUT}$ in the manner described in FIG. 4.

Although not shown in FIG. 5, the comparator comprises an oscillator, such as a Loyer oscillator, a Jensen oscillator, or the like, in an electric power source circuit thereof. The additional power source 46 may be formed by a combination of a winding connected to the oscillator and a rectifying and smoothing circuit.

The above-mentioned electric power source circuit is simple in structure as compared with that illustrated in FIG. 4 and is similar in operation and merit to the latter. Therefore, the circuit illustrated in FIG. 5 is economical in comparison with the circuit illustrated in FIG. 4.

Figure 6:
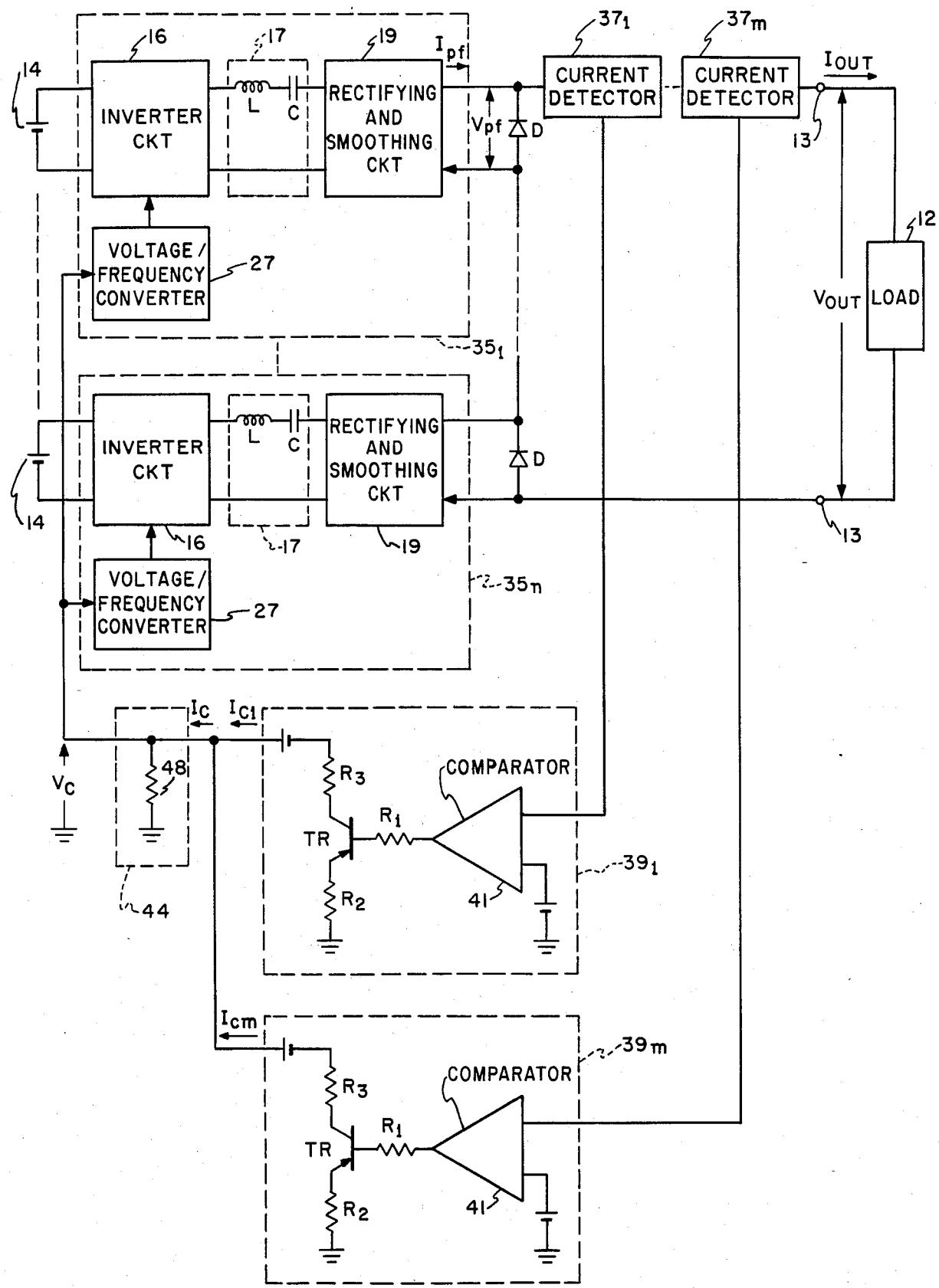
FIG. 6 is a block diagram of an electric power supply circuit according to a third embodiment of this invention.

Referring to FIG. 6, an electric power supply circuit according to a third embodiment of this invention is similar to that illustrated in FIG. 5 except that first through m-th current detectors $37_1$ to $31_m$ are connected in series to one another and connected to first through m-th control circuits $39_1$ to $39_m$, respectively. The number m may be equal to or different from the number n. The first and the m-th current detectors $37_1$ to $37_m$ supply first through m-th partial detection signals as the detection signal to the control circuits $39_1$ to $39_m$, respectively, each of which is similar in structure to the control circuit 39 illustrated in FIG. 5. The first through m-th control circuits $39_1$ to $39_m$ produce first through m-th partial control currents which are represented by $I_{c1}$ through $I_{cm}$, respectively. The first through m-th partial control currents $I_{c1}$ to $I_{cm}$ are combined into the control current $I_c$ to be sent to the current to voltage converter 44. The control current $I_c$ is converted into the control voltage $V_c$ by the additional resistor 48 of resistance R in the manner described in conjunction with FIG. 5. Accordingly, the control voltage $V_c$ is given by:

$$V_c \approx I_c \cdot R$$
$$= (I_{c1} + I_{c2} + \ldots + I_{cm}) \cdot R.$$

Thus, each of the difference voltages which are given from the comparators 41 is converted into the partial control currents to be combined into the control current $I_c$ and thereafter converted into the control voltage $V_c$. This means that a plurality of the difference voltages are combined into the control voltage $V_c$.

Operation can be carried out in the electric power supply circuit illustrated in FIG. 6 in a manner similar to those illustrated in FIGS. 4 and 5.

Even when a trouble occurs in one of the first through m-th control circuits $39_1$ to $39_m$, the above-mentioned structure can keep the circuit output current $I_{OUT}$ at a predetermined value by the remaining control circuits. Therefore, it is possible to reduce a fault rate of a control system to a rate less than several FIT (Fault in time) by the above-mentioned redundant structure of the control circuits.

The current to voltage converter 44 and each of the control circuits $39_1$ to $39_m$ may be replaced by those which are illustrated in FIG. 4, respectively.

Figure 7:
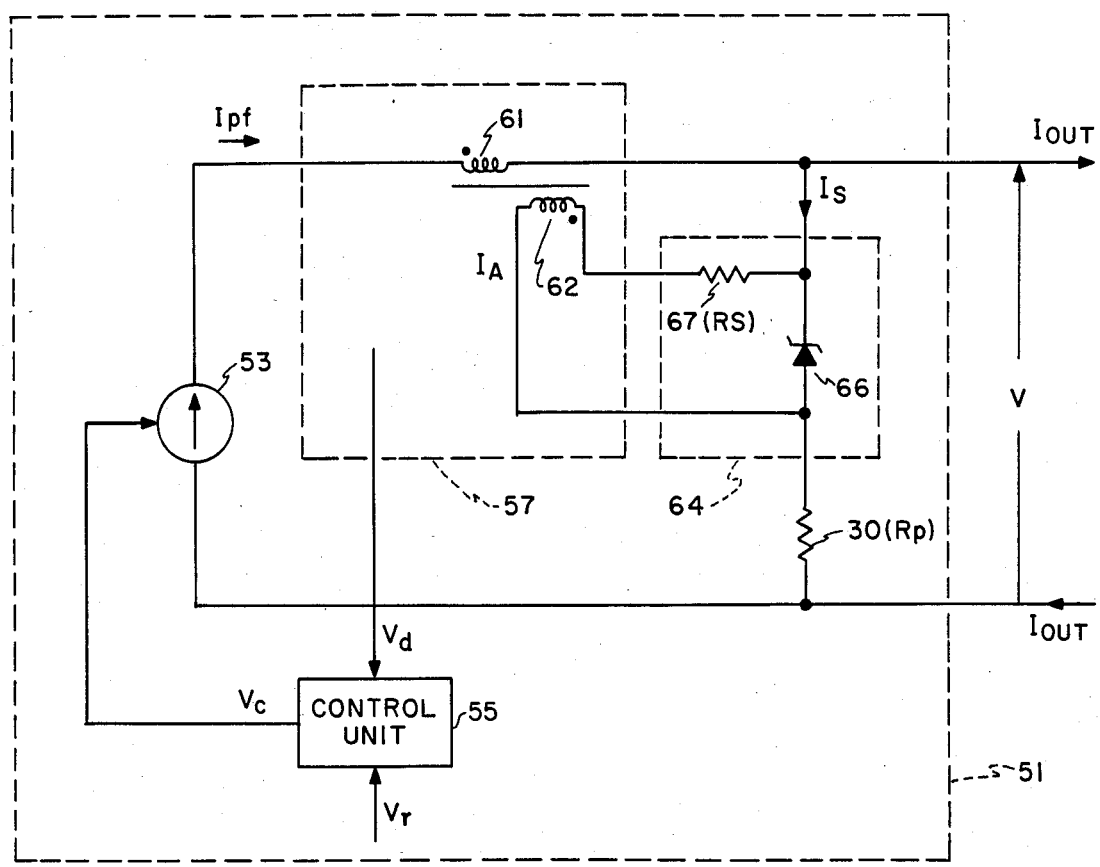
FIG. 7 is a block diagram of a constant current unit according to a fourth embodiment of this invention.

Referring to FIG. 7, a constant current unit 51 according to a fourth embodiment of this invention is used instead of that combination of the shunt resistor 30 and each of the constant current converters $11_1$ through $11_n$, which is illustrated in FIG. 1. In FIG. 7, the constant current unit 51 serves to mitigate an adverse influence of connection of the resistor 30 to each converter and comprises a constant current source 53 substantially equivalent to a combination of the main power source 14, the inverter circuit 16, the series resonant circuit 17, and the rectifying and smoothing circuit 19, all of which are illustrated in FIG. 1. The resistor 30 is assumed to have resistance $R_p$.

The constant current source 53 provides a source current in response to the local signal LS given from a control unit 55 which is an assemblage of the control circuit 23 and the voltage to frequency converter 27 both of which are illustrated in FIG. 1. The source current is similar to the resultant d.c. current $I_{pf}$ and is therefore depicted at the same reference symbol $I_{pf}$ as the resultant d.c. current.

The illustrated constant current unit 51 comprises a current detector 57 supplied with the source current $I_{pf}$. The current detector 57 is constituted by a magnetic amplifier which is specified by a saturable reactor and comprises a primary winding 61 and a subsidiary winding 62 of first and second winding numbers $N_1$ and $N_2$, respectively. The primary and the subsidiary windings 61 and 62 serve to detect the source current $I_{pf}$ in a manner to presently be described and to produce as the detection signal a detection voltage depicted at $V_d$. The remaining parts of the magnetic amplifier is omitted from this figure because they are well known in the art.

The shunt resistor 30 serves to partially shunt the source current $I_{pf}$ and to determine a share of the load (not shown in this figure), namely, each partial load in the manner mentioned in conjunction with FIG. 1. In the example being illustrated, the resistor 30 is connected in series to a current restriction circuit 64 comprising a Zener diode 66 and a bypass resistor 67 of resistance $R_s$. The Zener diode 66 has a Zener voltage $V_B$. A series connection of the bypass resistor 67 and the subsidiary winding 62 is connected across the Zener diode 66.

With this structure, the source current $I_{pf}$ flows through the primary winding 61, and is thereafter divided into a shunt current $I_s$ and the circuit output current $I_{OUT}$ which flow through a series circuit of the Zener diode 66 and the resistor 30 and through the load, respectively. A unit output voltage V is developed across the series connection of the shunt resistor 30 and the current restriction circuit 64 and is equivalent to the resultant d.c. voltage $V_{pf}$ described in conjunction with FIG. 1. An additional current $I_A$ is caused to flow through the secondary winding 62.

Under the circumstances, the detection voltage $V_d$ is proportional to a sum of first and second ampere-turns of the primary and the secondary windings 61 and 62, respectively, and is therefore given by:

$$V_d = g(N_1 I_{pf} + N_2 I_A), \quad (2)$$

where g represents a constant.

On the other hand, the reference voltage $V_r$ is determined as described in conjunction with the voltage control circuit 23 (FIG. 1) and is selected so that the following equation (3) holds. Namely, $$V_r = g \cdot N_1 \cdot I_{10}, \quad (3)$$

where $I_{10}$ is representative of an electric current predetermined in consideration of the first winding number $N_1$ and will be referred to as a predetermined current. The control unit 55 supplies the constant current source 53 with the control voltage $V_c$ representative of a difference between the detection voltage $V_d$ and the reference voltage $V_r$ in the manner described with reference to FIG. 1. The constant current source 53 controls the source current $I_{pf}$ so that the detection voltage $V_d$ (Equation (2)) becomes equal to the reference voltage $V_r$ (Equation (3)). Equalizing Equation (2) to Equation (3) results in:

$$I_{pf} = I_{10} - (N_2/N_1) \cdot I_A. \quad (4)$$

The additional current $I_A$ is equal to the shunt current $I_s$ as long as a voltage $V_Z$ across the Zener diode 66 is lower than the Zener voltage $V_B$. In this event, the circuit output current $I_{OUT}$ is given in consideration of Equation (4) by:

$$\begin{aligned} I_{OUT} &= I_{pf} - I_s \\ &= I_{10} - (1 + (N_2/N_1))I_A \\ &= I_{10} - (V/R), \end{aligned} \quad (5)$$

where $$R = (R_p + R_s)/(1 + (N_2/N_1)). \quad (6)$$

When the voltage $V_Z$ across the Zener diode 66 reaches the Zener voltage $V_B$, the additional current $I_A$ is defined by:

$$I_A = (V_B/R_s) \quad (7)$$

on the assumption that the secondary winding 62 has an extremely small resistance. Under the circumstances, the circuit output current $I_{OUT}$ is given by:

$$\begin{aligned} I_{OUT} &= I_{pf} - I_s \\ &= I_{10} - (N_2/N_1) \cdot (V_B/R_s) - (V - V_B)/R_p. \end{aligned} \quad (8)$$

Figure 8:
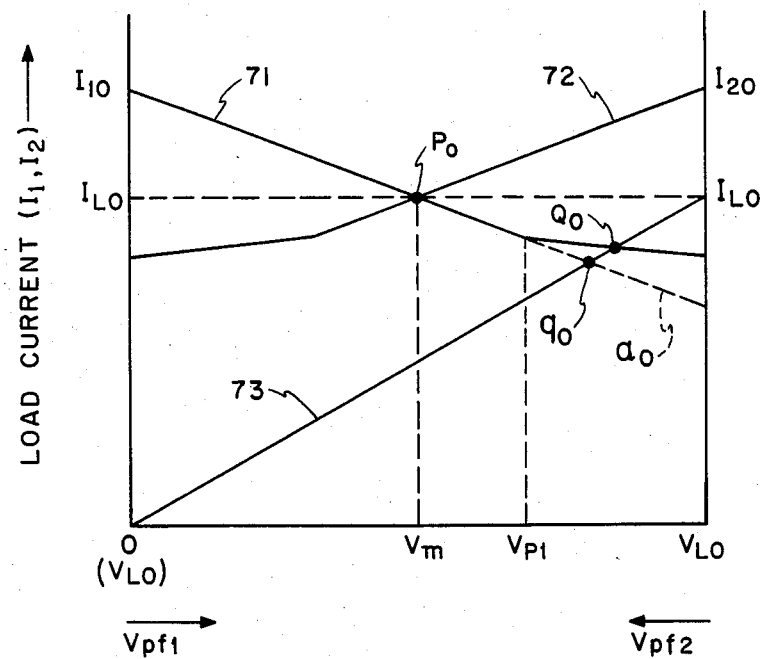
FIG. 8 is a graphical representation for use in describing operation of the constant current unit illustrated in FIG. 7.

Referring to FIG. 8, operation characteristics are illustrated which are specified by Equations (5), (6), and (8) and wherein first and second ones of the constant current units 51 illustrated in FIG. 7 are connected in series to each other in the manner illustrated in FIG. 1 to form an electric power supply circuit. In this event, the first and the second constant current units produce first and second unit output voltages depicted at $V_{pf1}$ and $V_{pf2}$ shown along the abscissa of FIG. 8 and first and second unit currents depicted at $I_1$ and $I_2$ shown along the ordinate. Each of the first and the second unit voltages $V_{pf1}$ and $V_{pf2}$ is equal to the unit output voltage V illustrated in FIG. 7.

In FIG. 8, curves 71 and 72 show the operation characteristics of the first and the second constant current units, respectively. Each unit current is gradually reduced from each maximum value $I_{10}$ and $I_{20}$ with an increase of each of the unit output voltages $V_{pf1}$ and $V_{pf2}$ due to each resistor 30 as is mentioned in conjunction with FIG. 1. More specifically, the first unit current $I_1$ is linearly reduced to a preselected voltage $V_{p1}$ at a prescribed gradient as shown by the curve 71 and is thereafter varied at another gradient smaller than the prescribed gradient. This is because another gradient is determined by Equation (8). The preselected voltage $V_{p1}$ may be called a transition voltage. The first unit current $I_1$ may vary within a controllable range determined by a prescribed control precision. The variation of the first unit current $I_1$ results in parallel displacement of the curve 71 which is directed upwards and downwards of this figure. This applies to the curve 72.

As long as no parallel displacement takes place, a load current $I_{10}$ flows through both of the first and the second constant current units as indicated at an intermediate point $P_0$. At this time, the first unit output voltage $V_{pf1}$ becomes an intermediate voltage $V_m$ which is equal to the second unit output voltage $V_{pf2}$. Therefore, the load is equally shared by the first and the second constant current units.

As readily understood from FIG. 8, a sum of the first and the second unit output voltages $V_{pf1}$ and $V_{pf2}$ is equal to the circuit output voltage $V_{OUT}$ and the predetermined electric current (Equation (3)) is equal to each maximum value $I_{10}$ and $I_{20}$.

In FIG. 8, the transition voltage $V_{p1}$ of the curve 71 is given by:

$$V_{p1} = (1 + (R_p/R_s))V_B. \quad (9)$$

Under the circumstances, it is proved that the operation characteristics specified by the curves 71 and 72 can be accomplished by selecting the resistances $R_p$, $R_s$, the Zener voltage $V_B$, and the first and the second winding numbers $N_1$ and $N_2$.

As are apparent from Equations (6) and (8), absolute values of the gradients of the curve 71 are equal to $1/R$ and $1/R_p$ when the first unit voltage $V_{p+1}$ is smaller and greater than the transistion voltage $V_{p1}$, respectively. From Equation (6), it is understood that a ratio $(N_2/N_1)$ of the winding numbers can be selected so that a reciprocal of $R_p$ becomes smaller than a reciprocal of R. In addition, a loss of electric power is determined by R and can be reduced by selection of the ratio of the winding numbers $N_1$ and $N_2$.

As a result, a loss of electric power can be reduced by selecting the resistances $R_p$ and R in the above-mentioned manner, as compared with the conventional electric power supply circuit illustrated in FIG. 1.

The transition voltage $V_{p1}$ can be selected so that the intermediate point $P_0$ falls within a portion of the curve 71 determined by the gradient of $1/R$. As shown in FIG. 8, a load characteristic is given by a line 73 defined by:

$$I_{OUT} = (V_{L0}/I_{L0}) \cdot V_{A0},$$

where $V_{L0}$ and $I_{L0}$ represent a load voltage and a load current during a normal operation of the load 12. It is possible to select the transition point $V_{p1}$ so that a crosspoint $Q_0$ between the curve 71 and the line 73 falls within another portion of the curve 71 determined by the gradient of $1/R_p$.

Each of the conventional converters 11 illustrated in FIG. 1 has a characteristic followed by a broken line $a_0$. A crosspoint between the broken line $a_0$ and the line 73 is placed at a conventional point $q_0$ and present on the lefthand side of the crosspoint $Q_0$. The crosspoint $Q_0$ is therefore nearer to a normal operation point than the conventional point $q_0$.

This means that a current variation of each of the first and the second output currents $I_{OUT1}$ and $I_{OUT2}$ can be reduced when operation is interrupted in either one of the first and the second constant current units.

Thus, it is possible to decrease the loss of electric power even on connection of the shunt resistor 30 by attaching the subsidiary winding 62 to the primary winding and by carrying out current control such that the ampere-turns in the primary and the subsidiary windings 61 and 62 coincide with predetermined values. It is also possible to reduce the current variation when either one of the constant current units is in trouble by causing the shunt current $I_s$ to flow through the subsidiary winding 62.

Figure 9:
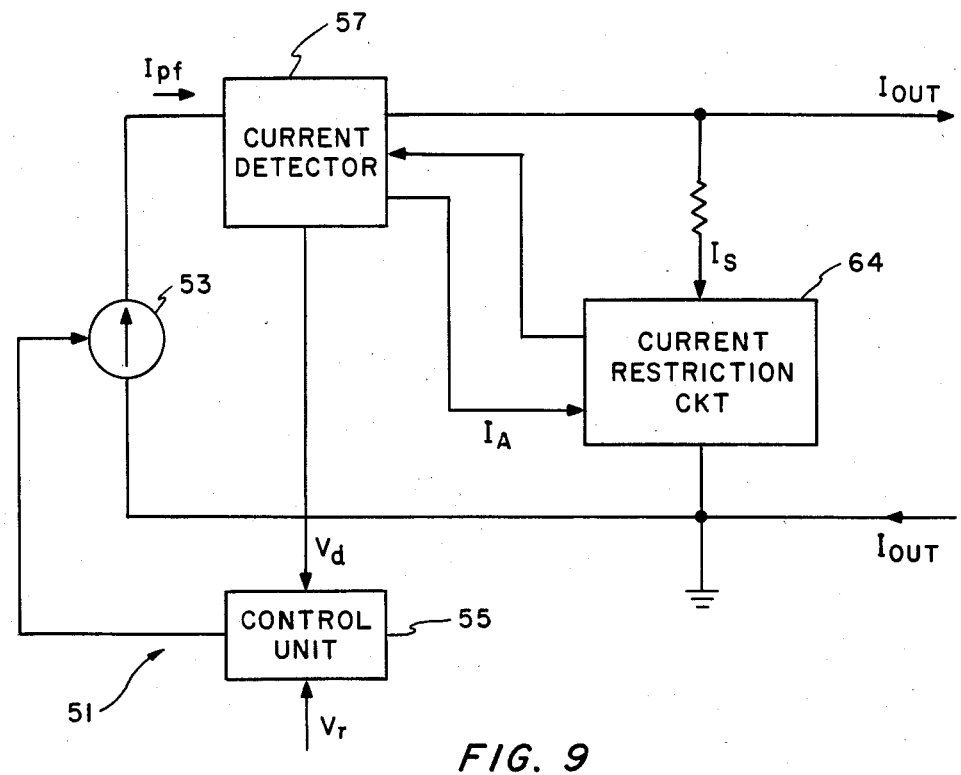
FIG. 9 is a block diagram of a constant current unit according to a fifth embodiment of this invention.

Referring to FIG. 9, a constant current unit 51 according to a fifth embodiment of this invention is similar to that illustrated in FIG. 7 except that the current restriction circuit 64 is grounded instead of the resistor 30. The illustrated current restriction circuit 64 supplies the subsidiary winding (not shown in this figure) of the current detector 57 with a low voltage as compared with the current restriction circuit 64 (FIG. 7). The subsidiary winding of the illustrated current detector 57 is not supplied with a high voltage and may not be resistant against high voltage. This means that no countermeasure is necessary against high voltage. Accordingly, the current detector 57 becomes economical.

Figure 10:
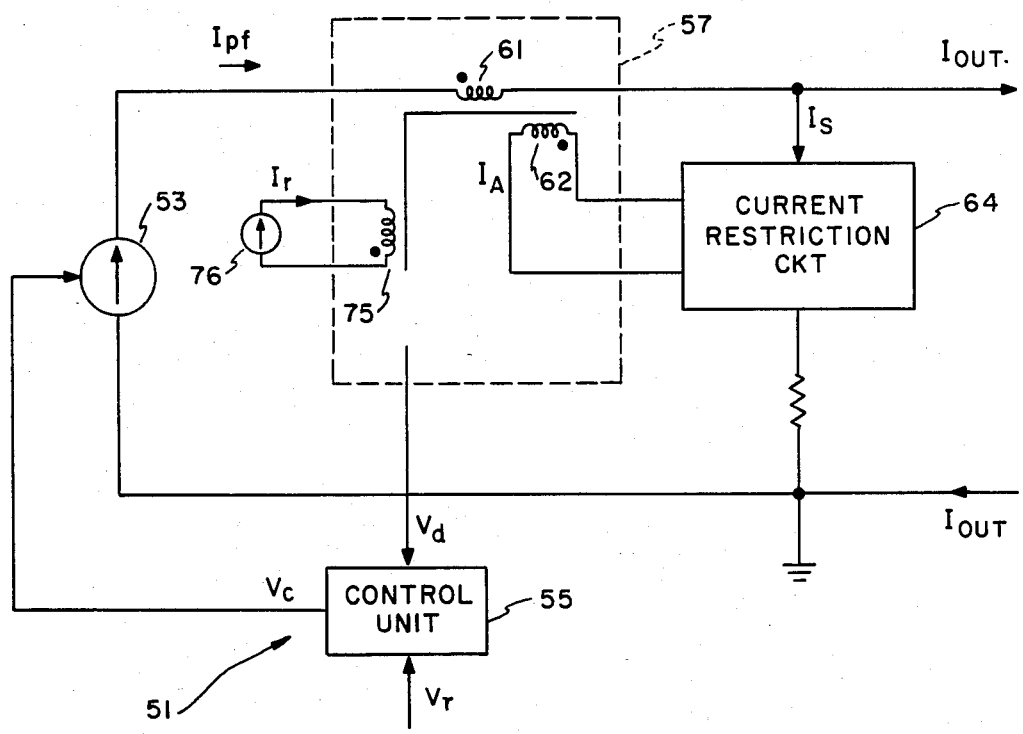
FIG. 10 is a block diagram of a constant current unit according to a sixth embodiment of this invention.

Referring to FIG. 10, an electric power supply circuit according to a sixth embodiment of this invention is similar to that illustrated in FIG. 9 except that a reference winding 75 of a winding number $N_r$ is included in the current detector 57 in addition to the primary and the subsidiary windings 61 and 62.

In the example being illustrated, a reference current $I_r$ is supplied from an additional constant current source 76. The reference current $I_r$ is caused to flow in a sense such that cancellation is possible of the sum of the ampere-turns of the primary and the subsidiary windings 61 and 62. Under the circumstances, the detection voltage $V_d$ is proportional to a composite value of $(N_1I_{pf} + N_2I_A - N_rI_r)$ and is sent to the control unit 55.

The illustrated control unit 55 is supplied with the reference voltage $V_r$ equal to zero and therefore produces the control voltage $V_c$ proportional to $V_d$. The control voltage $V_c$ is sent to the constant current source 53. In order to render the control voltage $V_c$ into zero, the constant current source 53 produces the source current $I_{pf}$ given by:

$$I_{pf} = (N_r/N_1) \cdot I_r - (N_2/N_1) \cdot I_3. \quad (10)$$

From Equations (4) and (10), it is readily understood that Equation (10) substitutes $(N_r/N_1) \cdot I_r$ for $I_{10}$ of Equation (4). Therefore, it is possible to carry out constant current control in the constant current unit illustrated in FIG. 10 like in FIG. 7.

Similar operation is possible by causing the shunt current $I_s$ to flow through the subsidiary winding 62 as it stands, if the shunt current $I_s$ is smaller than a predetermined current $I_{s0}$ and by causing the predetermined current $I_{s0}$ to flow through the subsidiary winding 62, if the shunt current $I_s$ exceeds the predetermined current $I_{s0}$.

Figure 11:
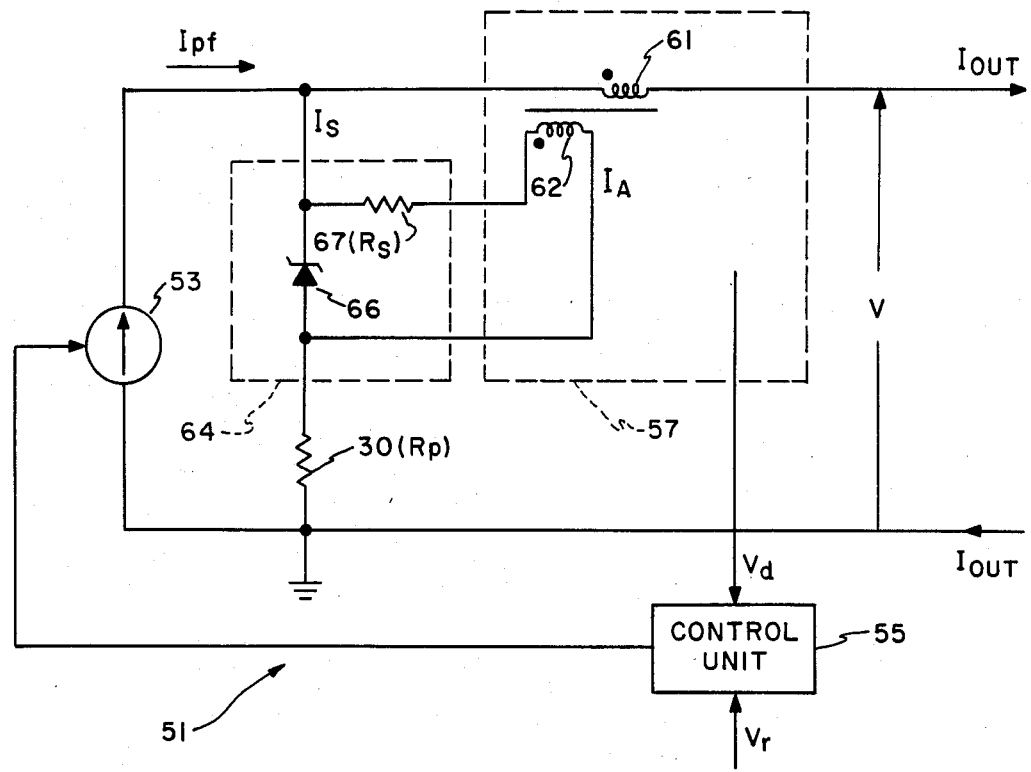
FIG. 11 is a block diagram of a constant current unit according to a seventh embodiment of this invention.

Referring to FIG. 11, a constant current unit according to a seventh embodiment of this invention is similar to that illustrated in FIG. 7 except that the current detector 64 (FIG. 11) detects the circuit output current $I_{OUT}$ instead of the source current $I_{pf}$. Like in FIG. 7, the current detector 64 comprises the primary and the subsidiary windings 61 and 62. In addition, the current restriction circuit 64 is connected in series to the resistor 30 to shunt the source current $I_{pf}$ and to thereby divide the source current $I_{pf}$ into the shunt current $I_s$ and the circuit output current $I_{OUT}$. The subsidiary winding 62 is connected across the Zener diode 66 through the bypass resistor 67.

When the voltage $V_Z$ across the Zener diode 66 is smaller than the Zener voltage $V_B$, Equations (4), (5), and (6) are rewritten in the illustrated circuit into:

$$I_{OUT} = I_{10} - (N_2/N_1) I_A, \quad (4')$$

$$I_{OUT} = I_{10} - (N_2/N_1) I_s, \quad (5')$$
$$= I_{10} - (V/R),$$

and $$R = (R_p + R_s)/(N_2/N_1), \text{ respectively.} \quad (6')$$

When $V_Z = V_B$, Equation (8) is also rewritten into:

$$I_{OUT} = I_{10} - (N_2/N_1)(V_B/R_s). \quad (8')$$

As is apparent from Equation (5'), the circuit output current $I_{OUT}$ is varied in accordance with a gradient determined by $(1/R)$ when the unit output voltage V does not reach the transition voltage $V_{p1}$ (FIG. 8). On the other hand, the circuit output current $I_{OUT}$ is invariable when the unit output voltage V reaches the transition voltage $V_{p1}$.

With this structure, it is possible to reduce a loss of electric power as compared with the conventional constant current circuit, like in the unit illustrated in FIG. 7.

Figure 12:
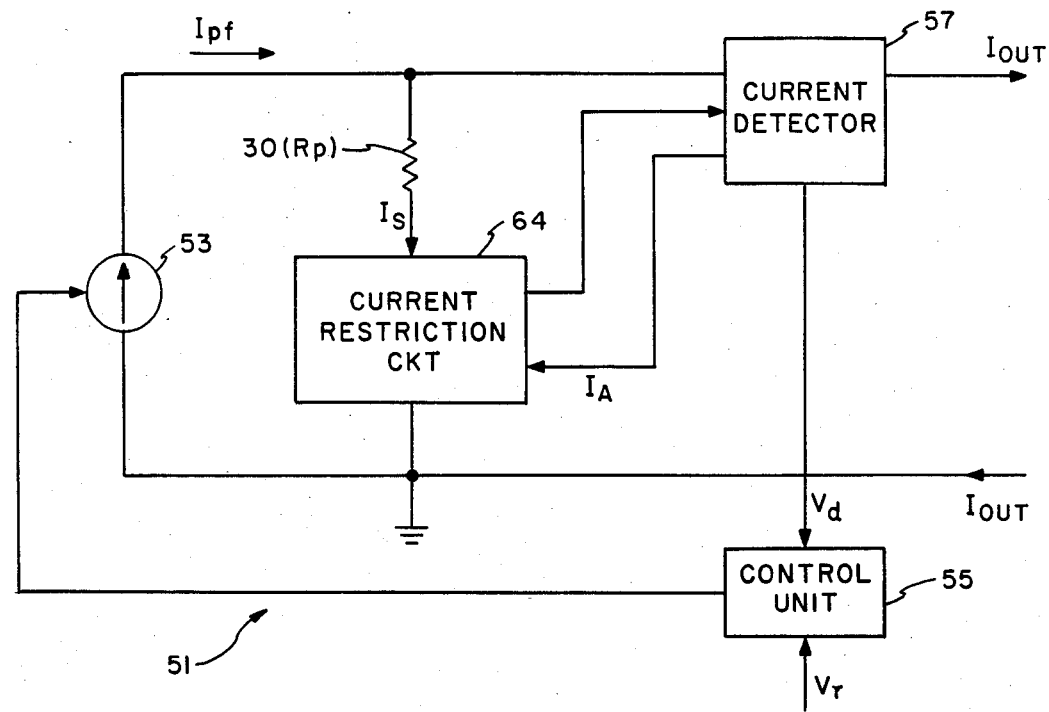
FIG. 12 is a block diagram of a constant current circuit according to an eighth embodiment of this invention.

Referring to FIG. 12, a constant current unit according to an eighth embodiment is similar to that ilusrated in FIG. 11 except that the current restriction circuit 64 is grounded instead of the resistor 30. With this structure, the current restriction circuit 64 supplies the subsidiary winding (not shown in this figure) of the current detector 64 with a voltage lower than the voltage produced by the current restriction circuit 64 of FIG. 11. Therefore, the illustrated current detector 64 may be simple in structure like in FIG. 9.

Figure 13:
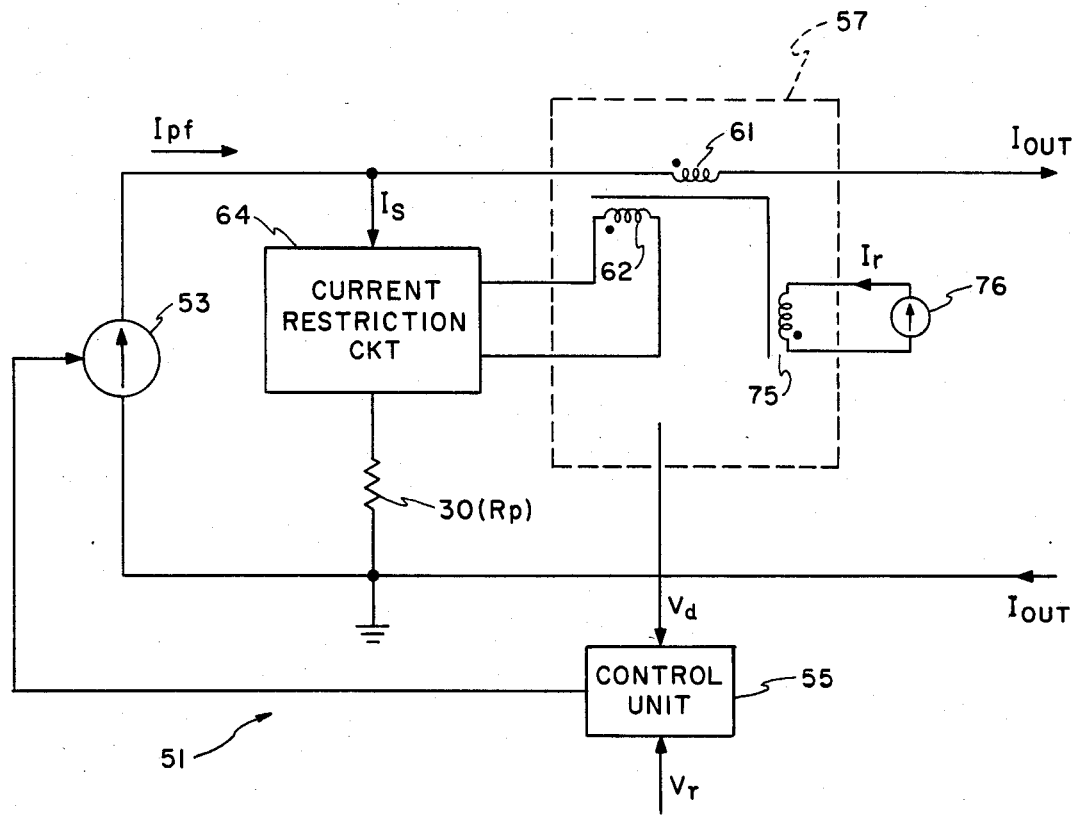
FIG. 13 is a block diagram of a constant current unit according to a ninth embodiment of this invention.

Referring to FIG. 13, a constant current unit according to a ninth embodiment of this invention is similar to that illustrated in FIG. 11 except that a reference winding 75 is driven by an additional constant current source 76 which produces a reference current $I_f$. The reference winding 75, the additional constant current source 76, and the reference current $I_f$ are similar to those described in conjunction with FIG. 13 and will not be described any longer. In the example being illustrated, it is to be noted that Equation (10) is rewritten into:

$$I_{OUT} = (N_r/N_1) \cdot I_r - (N_2/N_1) \cdot I_A.$$

While this invention has thus far been described in conjunction with about ten embodiments thereof, it will readily be possible for those skilled in the art to put this invention into practice in various other manners. For example, the electric power supply circuit may be applicable to an analog communication system.

What is claimed is:

1. An electric power supply circuit including a plurality of constant current units connected in series to a pair of terminals for supplying an electric current to a current path which is shared by said constant current units as a load, current detecting means coupled to said current path for detecting said electric current to produce a detection signal having a detection voltage, and control means responsive to said detection signal for producing a control current, each of said constant current units being controllable by a control voltage corresponding to said control current to share said load with the respective constant current units as partial loads of a predetermined distribution, wherein the improvement comprises:
   single current to voltage converting means coupled to said control means and responsive to said control current for converting said control current into a converted voltage;
   voltage supply means coupled to said current to voltage converting means for supplying said converted voltage to said constant current units in common as said control voltage to control said partial loads in compliance with said predetermined distribution;
   said current detecting means comprises:
   a plurality of current detectors coupled to said current path for detecting said electric current to produce a plurality of partial detection signals as said detection signal; and
   said control means comprising:
   a plurality of control circuits coupled to the respective current detectors for supplying a plurality of partial control currents to said single current to voltage converting means as said control current.

2. An electric power supply circuit as claimed in claim 1, wherein said control means comprises:
   reference signal producing means for producing a reference voltage;
   comparing means responsive to said detection signal and coupled to said reference signal producing means for comparing said detection voltage with said reference voltage to produce a difference voltage signal representative of a difference between said detection voltage and said reference voltage; and
   converting means responsive to said difference voltage signal for converting said difference voltage signal into said control current.

3. A constant current unit for use in producing a circuit output current and comprising a controllable current source responsive to a local signal for providing a source current, a resistor for partially making a shunt current flow therethrough to divide said source current into said circuit output current and said shunt current, first current detecting means for detecting current from either said circuit output current or said source current to produce a detection signal, control means responsive to said detection signal for producing a control signal, and means for supplying said control signal as said local signal to said controllable current source, wherein the improvement comprises:
   second current detecting means for detecting a second current related to said selected one of the circuit output and the source currents; and
   current restriction means connected in series to said resistor for restricting said shunt current with reference to said second current.

4. A constant current unit as claimed in claim 3, wherein said detected current is said circuit output current.

5. A constant current unit as claimed in claim 3, wherein said said detected current is said source current.

6. An electric power supply circuit comprising:
   a plurality of constant current units which are connected in series to a pair of terminals in order to supply an electric current to a load in a current path which is shared by said constant current, each of said constant current units comprising a voltage to frequency converter means operated responsive to a voltage signal having a voltage level for converting said voltage signal into a signal having a frequency which is determined by said voltage level, and d.c. to d.c. converting means responsive to a d.c. input signal and to said frequency signal for converting said d.c. input signal into a d.c. output signal with reference to said frequency signal;

current detecting means coupled to said current path for detecting said electric current in order to produce a detection signal having a detection voltage;

control means responsive to said detection signal for producing a control current which is dependent on said detection signal;

current to voltage converting means coupled to said control means for converting said control current into a converted voltage signal; and voltage supply means coupled to said current to voltage converting means for supplying said converted signal to said constant current units in common.

7. An electric power supply circuit as claimed in claim 6, wherein:

said current detecting means comprises:

a plurality of current detectors coupled to said current path for detecting said electric current to produce a plurality of partial detection signals as said detection signal;

said control means comprising:

a plurality of control circuits coupled to the respective current detectors for supplying a plurality of partial control currents to said single current to voltage converting means as said control current.

8. An electric power supply circuit as claimed in claim 6, wherein said current detecting means comprises:

a single current detector for detecting said electric current to produce said detection signal;

said control means comprising:

a control circuit coupled between said single current detector and said current to voltage converting means for supplying said control current to said current to voltage converting means.

9. An electric power supply circuit as claimed in claim 6, wherein said d.c. to d.c. converting means comprises a serial resonant circuit having a resonant frequency related to said frequency of the frequency signal.

* * * * *